United States Patent Office 3,292,320
Patented Dec. 20, 1966

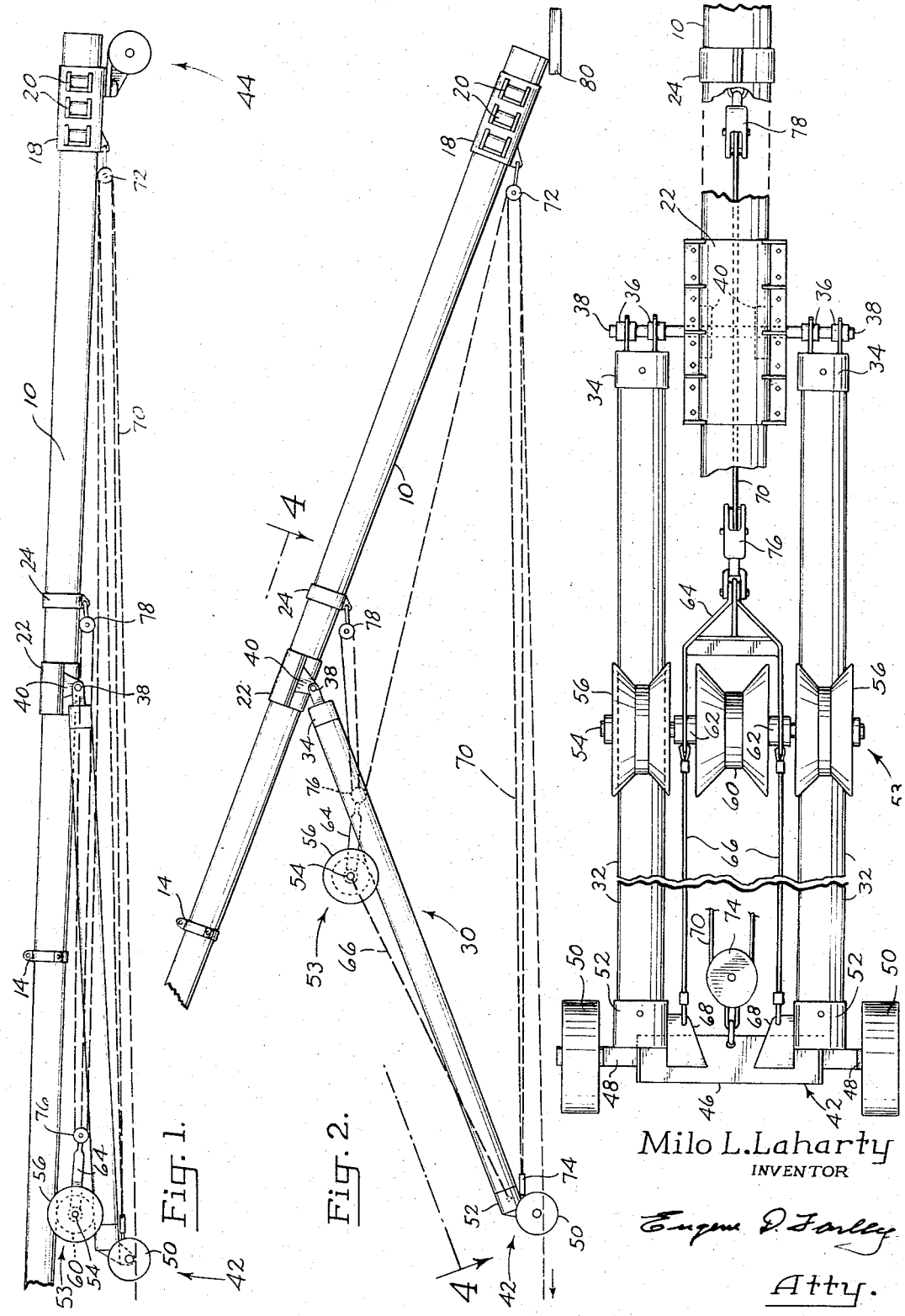

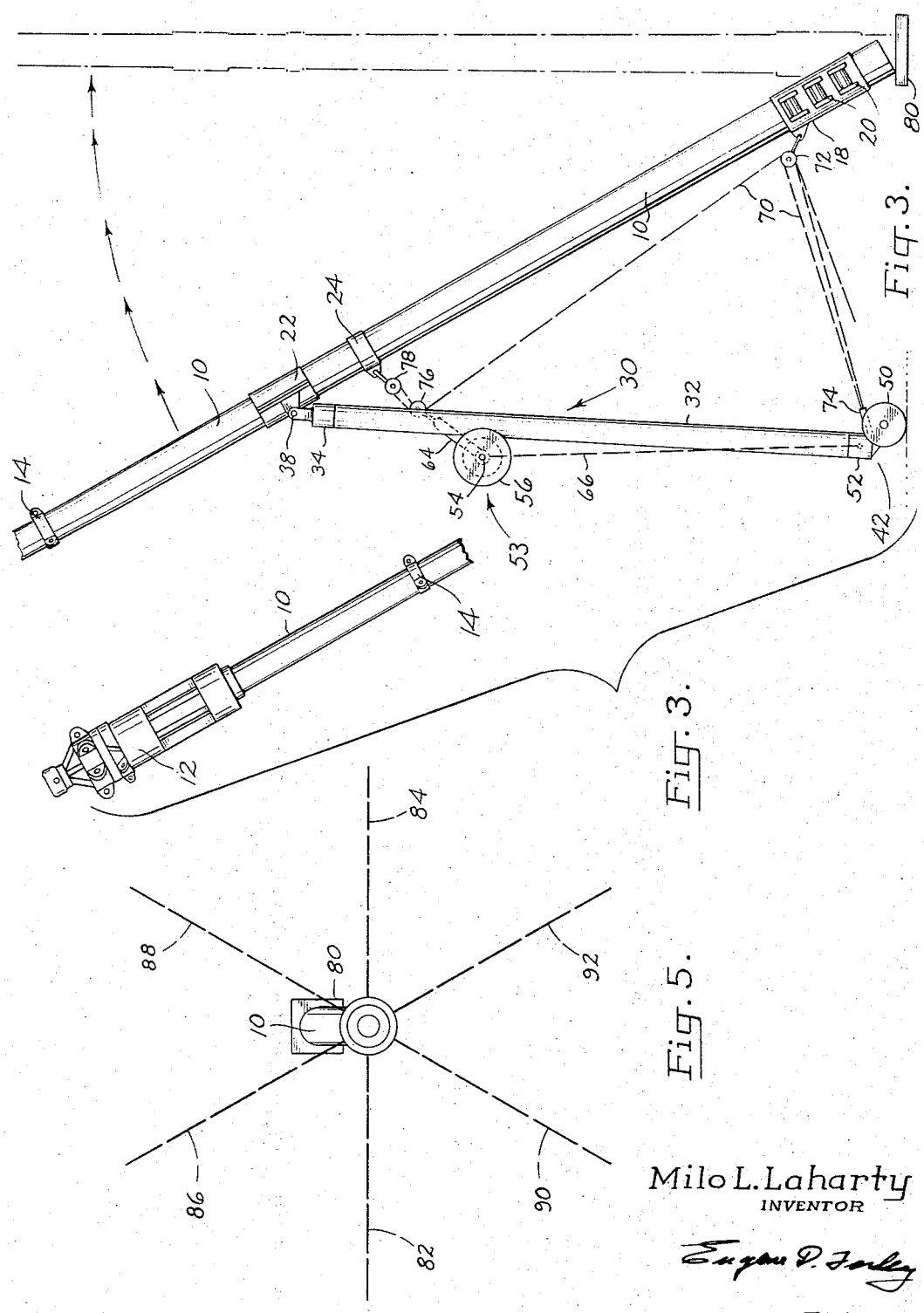

1

3,292,320
PORTABLE SPAR POLE
Milo L. Laharty, Roseburg, Oreg., assignor to Forrest Industries, Inc., Dillard, Oreg., a corporation of Oregon
Filed Apr. 9, 1965, Ser. No. 446,942
8 Claims. (Cl. 52—119)

This invention pertains to portable spar poles for use in logging. It pertains in general to apparatus for lifting spar poles and other elongated objects to an erect position.

In logging operations it traditionally has been the practice to select a spar tree at the logging site. A high climber tops the tree and delimbs it. The spar tree is fitted with guy lines and blocks and suitable winches are disposed at its base. Cables are then run from the winches through the blocks as required to drag the logs from the felling site to the base of the spar tree and to return the cables to the felling site.

The foregoing procedure has obvious disadvantages. A suitable spar tree is not always available in the most convenient location. Preparing and rigging the spar tree is a costly, time consuming and dangerous operation. The preparation of the logging site requires the presence on the crew of a person having the specialized skills of a high climber.

Because of the foregoing disadvantages of the traditional spar tree, there have been developed portable spar poles which may be moved from place to place and erected in any desired location. These two have had their limitations. In the first place, their initial cost is so high as to make their use prohibitive in many instances. In the second place, their maintenance presents a serious problem. To achieve the necessary height while at the same time preserving their portability the usual portable spar poles comprise telescoping sections of heavy steel pipe. Because of the rugged conditions of use to which they are subjected, it is an easy matter to bend the pipe sections sufficiently so that they no longer will telescope. Not only is such damage difficult and expensive to repair, but the accidents causing it usually occur in the woods where repair facilities are not available. The entire logging crew thus may be idled during the extended time period required for repair and location of the spar pole.

Accordingly it is the general object of the present invention to provide a spar pole which utilizes in place of telescoping steel pipe sections a wooden pole which may be cut at or near the logging site and which accordingly is relatively inexpensive and maintenance free.

Another object of the present invention is the provision of a spar pole which is versatile in its application in that the entire spar pole may be transported from site to site or, in the alternative, the fitting only transported, the pole itself being cut at each particular site.

Other objects of the present invention are the provision of a portable spar pole which is adaptable for use in both small and large logging operations, which is safe in transit as well as on the yarding site, which may be erected rapidly, and which is efficient in its operation.

Still a further object of the present invention is the provision of apparatus for lifting to an erect position elongated objects such as spar poles, telephone poles, steel conduits, girders and the like.

The manner in which the foregoing and other objects of the present invention are accomplished will be apparent from the accompanying specification and claims considered together with the drawings, wherein:

FIG. 1 is a fragmentary view in side elevation of the portable spar pole of my invention in prone position in which it is moved from place to place;

2

FIG. 2 is a fragmentary view in side elevation similar to FIG. 1, but illustrating the first stage of erection of my portable spar pole;

FIG. 3 is a view in side elevation similar to FIGS. 1 and 2, illustrating the final stages of erection of my portable spar pole;

FIG. 4 is a fragmentary plan view looking in the direction of the arrows 4—4 of FIG. 2 and illustrating the construction of a wedging mechanism incorporated in my portable spar pole for facilitating the initial stages of its erection; and FIG. 5 is a schematic view of a log yarding site illustrating the manner of erection of the herein described portable spar pole.

Generally stated, the portable spar pole of my invention comprises a long pole or other elongated object. Thrust lever means are positioned beneath the pole, parallel thereto and extending from an intermediate point of the pole toward its top. Connecting means pivotally interconnect the intermediate point of the pole and the adjacent end of the thrust lever means. A cable and pulley assembly interconnect the base of the pole and the unsecured end of the thrust lever means.

Upon pulling on the free end of the cable, a jackknife action occurs which moves the free end of the thrust lever toward the base of the pole, thereby erecting the latter. Since at the start of the operation the thrust lever and the pole are substantially parallel to each other, wedge means also are provided for wedging the pole upwardly until the leverage of the thrust lever can be applied to best advantage.

Although, as has been indicated above, the invention may be applied to the erection of telephone poles, long girders, long pipes and other elongated objects, it is illustrated and described herein with particular reference to the erection of a portable spar pole, indicated at 10 in the drawings. This pole may be 60 to 100 feet or more in length. Although its transportation from site to site is contemplated, it is expendable and may be discarded if damaged since another pole may be cut at the next site.

Spar pole 10 is fitted in the usual manner with a cap piece 12 for mounting the cable fittings, with a central collar 14 for mounting guy lines, and with a collar 18 at the base upon which winches 20 may be mounted. In addition, the spar pole is fitted with a central girdle 22 and, slightly below the girdle, with a special collar 24 mounting a pulley which is one of the components of the presently described apparatus.

Thrust lever means indicated generally at 30 pivotally are connected to the spar pole for raising it to an elevated position. When the spar pole is in the prone position in which it is transported, the thrust lever means are positioned beneath the pole extending from an intermediate point of the pole toward the top thereof.

In the illustrated form of the invention, the thrust lever means comprise a pair of long levers 32, the upper surfaces of which are formed with tracking surfaces.

The ends of the levers which are adjacent the intermediate point of the pole, and which underlie girdle 22 are provided with caps 34 which mount aligned bearings 36. The latter in turn journal a shaft 38 which pivotally connects the lever ends to tab 40 extending downwardly from girdle 22.

The other ends of levers 32 are connected to a wheeled platform or truck 42 which is used for transporting the spar pole from place to place. It cooperates with a second wheeled platform 44 which in the practical application of the invention may comprise a steering trailer. Thus wheeled platform 42 becomes the front mounting unit of a vehicle on which the spar pole is towed, the rear mounting unit comprising steering trailer 44.

Truck 42 includes a horizontal base plate 46, the underside of which mounts an axle 48. Wheels 50 are journaled on the axle.

Plate 46 pivots about axle 48. It supports the outer ends of levers 32 which mount cap pieces 52 welded to plate 46.

A wedging carriage illustrated generally at 53 having for its function the partial support of pole 10 and the wedging of the pole to a slight inclination from the horizontal during the initial stage of the pole raising procedure, is mounted on the upper tracking surfaces of the levers 32.

As shown in FIG. 4, the wedging carriage comprises a shaft 54 extending crosswise of levers 32. Grooved wheels 56 are journaled on the shaft and track on the upper surfaces of the levers. A grooved pole support wheel 60 is mounted on the central portion of the shaft between tracking wheels 56.

Wheel 60 is fixed to a bearing sleeve 62 which also mounts a forwardly extending yoke 64. Sleeve 62 further mounts the forward ends of a pair of limit cables 66, the rearward ends of which are fastened to tabs 68 extending forwardly from plate 46. The function of limit cables 66 is to limit the maximum position of advancement of wedging carriage 53. This position may be controlled by adjusting the length of cable 66.

Cable and pulley means are provided for actuating wedging carriage 53 by means of which the pole initially is raised from its prone position, and also for actuating the thrust lever assembly 30 to continue the elevation of the pole until it has reached its erect position.

To this end there is provided a continuous cable 70 which is mounted on a power driven winch, not illustrated but located to the left of FIG. 1. This cable is reeved about a double pulley 72 mounted on winch collar 18; through a single pulley 74, attached centrally to plate 46 of truck 42; back through the other spool of double pulley 72; through a single pulley 76 mounted forwardly of yoke 64 on wedging carriage 53; and through single pulley 78 connected to collar 24 on pole 10. The end of the cable then dead ends on wedging carriage 53.

OPERATION

The manner of operation of the herein described portable spar pole is evident from the consideration of the procedural sequence illustrated in FIGS. 1, 2 and 3.

FIG. 1 illustrates the prone, substantially horizontal position of the spar pole as it is transported from place to place. One end rests on truck 42, the other on steering trailer 44. Truck 42 thus becomes the leading end of the portable assembly as it is moved from place to place. Steering trailer 44 is independently operated and assists in its movement. It is to be observed that the weight of the spar pole is supported in substantial part on the freely rotatable spool 60 of wedging carriage 53.

When the spar pole reaches the logging site, it is maneuvered until its butt end is in the desired location. A special bearing pad 80 may be provided if desired.

The free ends of square leads 82, 84 and of back guy lines 86, 88 are attached to stumps or other solid supports.

The winch to which cable 70 is attached is put in motion, thereby shortening the cable.

The first effect is to move wedging carriage 53 to the right, as viewed in the drawings. During this movement wheels 56 track on the upper track surfaces of thrust levers 32. Freely rotatable wheel 60 supporting the pole rotates in the opposite direction.

Wedging carriage 53 moves to the end of its travel, which optionally may be limited by limit cable 66. As it moves, it wedges spar pole upwardly, moving it past the substantially dead center position of FIG. 1.

After wedging carriage 53 has reached its maximum position of advancement, continued shortening of cable 70 draws the outer ends of thrust levers 32 toward the butt of pole 10. The resulting thrust raises the pole through the full line position of FIG. 3 to the dotted line position of that figure. As the pole is raised, all the guy lines including front guy lines 90, 92 are adjusted and secured as necessary to stabilize it.

When the spar pole is to be lowered, the foregoing sequence is reversed.

The spar pole of my invention thus may be transported rapidly from place to place. At each site it may be raised and lowered rapidly and safely in but a fraction of the time required to rig a spar tree. The maintenance problem attending the use of a portable spar pole including a main stem made up of telescoping sections of steel pipe is completely absent. In the event that the spar pole is damaged, or in the event that its transportation from place to place is difficult, the spar pole stem may be discarded and a new one provided at the new site, the fittings only being transported.

It accordingly will be seen that there is provided an apparatus in which the several objects of this invention are achieved and which is well adapted for the conditions of practical use.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:
1. A portable spar pole comprising
   (a) a long pole having a bottom end adapted to butt against the ground and a top end adapted to support log hauling apparatus,
   (b) thrust lever means positioned beneath the pole parallel thereto and extending from an intermediate point of the pole toward the top thereof,
   (c) pivotal connecting means pivotally connecting the intermediate point of the pole and the adjacent end of the thrust lever means, and
   (d) cable and pulley means interconnecting the base of the pole and the unsecured end of the thrust lever means for raising the pole to an erect position, and
   (e) wedge means between the pole and thrust lever means and movable toward said pivotal connecting means for wedging the pole away from the thrust lever means.

2. The portable spar pole of claim 1 including wedge carriage means interposed between the thrust lever means and the pole, and means connected to the wedge carriage means for moving it in a pole wedging direction toward the pivotal connecting means.

3. The portable spar pole of claim 1 wherein the thrust lever means comprise a pair of spaced, parallel, thrust levers and wheeled truck means mounted on and supporting the outer ends of the levers.

4. The portable spar pole of claim 1 wherein the thrust lever means comprise a pair of spaced, parallel, thrust levers having tracks on their upper surfaces and including wheeled wedge carriage means comprising a shaft arranged transversely of the levers, a pair of tracking wheels rotatably mounted on the shaft and engaging the tracks, between the tracking wheels a pole support wheel mounted on the shaft for free rotation, and drive means connected to the carriage for moving the same in the direction of the pivotal connecting means.

5. The portable spar pole of claim 1 wherein the thrust lever means comprise a pair of spaced, parallel, thrust levers having tracks on their upper surfaces and including wheeled wedge carriage means comprising a shaft arranged transversely of the levers, a pair of tracking wheels rotatably mounted on the shaft and engaging the tracks, between the tracking wheels a pole support wheel mounted on the shaft for free rotation, drive means connected to the carriage for moving the same in the direction of the pivotal connection means, and limit cable means, one end of which is connected to the outer ends of the thrust levers and the other to the wedging carriage for limiting the linear travel thereof.

6. The portable spar pole of claim 5 wherein the cable and pulley means and the drive means for the wedging carriage comprise a double pulley mounted to the base of the pole, a single pulley mounted to the outer ends of the thrust levers, a single pulley mounted on the wedging carriage and a single pulley mounted on the pole between the pivotal connecting means and the pole bottom, and a flexible cable connected at one end to a winch, reeved about the pulleys, and fastened at the other end to the carriage.

7. Apparatus for raising long poles to an erect position and comprising:
 (a) thrust lever means adapted to be positioned beneath the pole parallel thereto and extending from an intermediate point of the pole toward the top thereof,
 (b) pivotal connecting means for pivotally connecting the intermediate point of the pole and the adjacent end of the thrust lever means,
 (c) cable and pulley means,
 (d) mounting means for mounting the cable and pulley means between the unsecured end of the thrust lever means and the base of the pole for raising the pole to an erect position, and
 (e) wedge means mounted on the thrust lever means for movement along the latter and arranged to engage the overlying portion of a long pole and to wedge the latter away from the thrust lever means as it moves toward the pivotal connecting means.

8. The apparatus of claim 7 including wedge carriage means interposed between the upper surface of the thrust lever means and the under surface of the pole, and drive means connected to the carriage means for driving it in the direction of the pivotal connecting means, thereby wedging the pole upwardly.

References Cited by the Examiner
UNITED STATES PATENTS

| | | | |
|---|---|---|---|
| 2,664,976 | 1/1954 | Woolsayer et al. | 52—119 |
| 3,033,526 | 5/1962 | Priest | 254—139.1 |

FOREIGN PATENTS

| | | |
|---|---|---|
| 358,828 | 9/1922 | Germany. |
| 707,372 | 6/1941 | Germany. |

HUGO O. SCHULZ, *Primary Examiner.*